June 12, 1956 J. K. DOUGLAS 2,749,708
HYDRAULIC DRIVE FOR ELEVATORS AND THE LIKE
Filed March 14, 1955 3 Sheets-Sheet 1

INVENTOR
JAMES K. DOUGLAS
BY Wesley P. Merrill
ATTORNEY

June 12, 1956 J. K. DOUGLAS 2,749,708
HYDRAULIC DRIVE FOR ELEVATORS AND THE LIKE
Filed March 14, 1955 3 Sheets-Sheet 2

INVENTOR
JAMES K. DOUGLAS
BY Wesley P. Merrill
ATTORNEY

June 12, 1956     J. K. DOUGLAS     2,749,708
HYDRAULIC DRIVE FOR ELEVATORS AND THE LIKE
Filed March 14, 1955     3 Sheets-Sheet 3
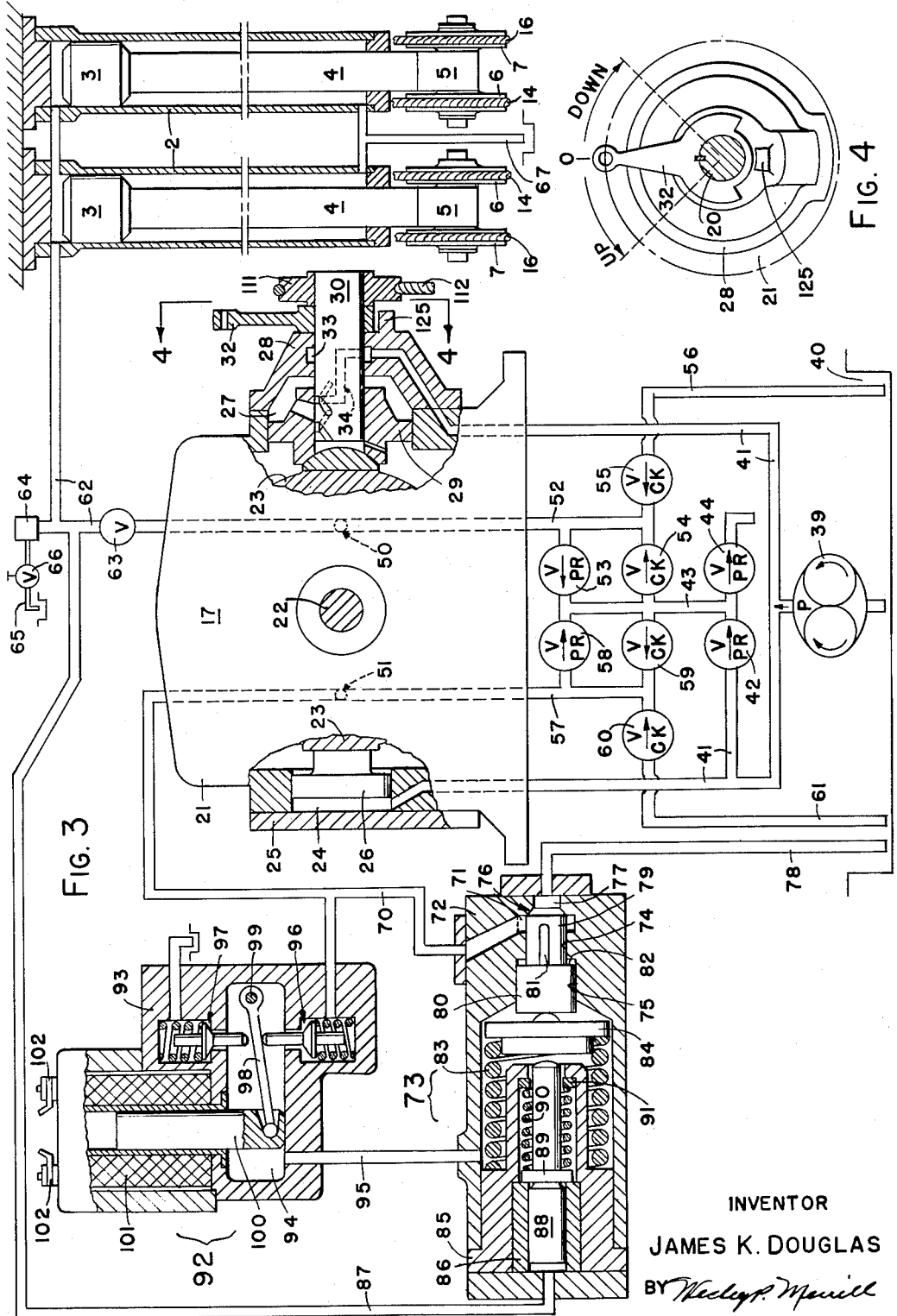
INVENTOR
JAMES K. DOUGLAS
BY
ATTORNEY United States Patent Office 2,749,708
Patented June 12, 1956

2,749,708
HYDRAULIC DRIVE FOR ELEVATORS AND THE LIKE

James K. Douglas, Shorewood, Wis., assignor to The Oilgear Company, Milwaukee, Wis., a corporation of Wisconsin Application March 14, 1955, Serial No. 494,195

11 Claims. (Cl. 60—52)

This invention relates to drives for moving in one direction loads which are moved in the opposite direction by a different force such as gravity.

A drive embodying the invention is particularly adapted for operating an elevator of the gravity return type and the invention will be explained as being employed for that purpose but it is to be understood that the invention is not limited to such use.

A hydraulic elevator includes at least one hydraulic motor, mechanical means connecting the motor to the elevator, a reversible pump for supplying motive liquid to the motor to energize it, an electric motor connected to the pump to drive it, and suitable controls. The displacement of the pump is zero when the elevator is stationary. To raise the elevator the pump is adjusted to deliver liquid to the hydraulic motor. When the pump is reversed, the elevator will descend by gravity and cause the hydraulic motor to discharge liquid therefrom. That liquid will enter the pump and cause it to function as a motor and to drive the electric motor which will regenerate electric power as is well known.

Under certain conditions it is not feasible to regenerate all electric power that it is possible to regenerate. For example, a ship having a plurality of cargo elevators ordinarily has only one relatively small generator which usually is driven by a steam turbine. If the elevators were provided with hydraulic drives which are powered by electric motors as explained above and if several elevators with substantial loads thereon should happen to descend at the same time with no other electric devices operating on the ship, the energy generated by electric motors would exceed the energy required to drive the generator and would speed it up beyond the permissible speed. When the generator reached its rated speed, it would shut off all steam to the turbine which would spin idly. Since the generator would be driven electrically instead of mechanically, it could not maintain the proper voltage aboard the ship.

The present invention has as an object to provide an electrically powered hydraulic drive which will move a load in one direction at a regulated rate, which will regulate the speed of the load when it is moved in the opposite direction by a separate force, which will regenerate electric power during movement of the load in said opposite direction, and which will limit the amount of regenerated power.

Another object is to provide an electrically powered hydraulic drive which will positively prevent movement of the load in case the electric power should fail.

Another object is to provide a hydraulic drive having means for warming up the motive liquid before the drive starts to move a load.

These and other objects and advantages will appear from the following description of the embodiment of the invention shown schematically in the accompanying drawings in which the views are as follows:

Fig. 3 is a circuit diagram illustrating the functions of some of the elements shown in Fig. 1.

Fig. 4 is an enlarged view of the control lever of the pump shown in Figs. 1 and 3, the view being taken on the line 4—4 of Fig. 3.

For the purpose of illustration, the invention has been shown embodied in an elevator for moving cargo between the upper and lower holds of a ship which are, respectively, the spaces between the main deck A and the middle deck B and between the middle deck B and the bottom deck or tank top C of the ship. The elevator includes a platform 1 which is supported from deck A and is movable between a position in which its upper surface is flush with the top of deck C, as shown, and a position in which its upper surface is flush with the top of deck B.

Access to the upper hold is had through cargo doors (not shown) in the side of the ship. Cargo to be carried in the lower hold is picked up from the pier by industrial trucks which then run through the cargo doors and onto platform 1. When the platform is loaded, it descends to the bottom deck, then the trucks run off the platform and deposit their loads in the lower hold, return to the platform and are hoisted to the middle deck to get other loads. When unloading, the trucks pick up loads from the lower hold and run onto the platform which is then raised to the middle deck to permit the trucks to run through the cargo doors and deposit their loads on the pier. In one fleet, each ship has four such elevators.

Power for raising platform 1 is supplied by two single-acting hydraulic motors each comprising a cylinder 2 (Fig. 3) which has its upper end closed and attached to deck A, a piston 3 which is closely fitted in cylinder 2 to reciprocate therein, and a piston rod 4 which is fixed to piston 3 and extends through the lower end of cylinder 2.

Figures 1, 5:
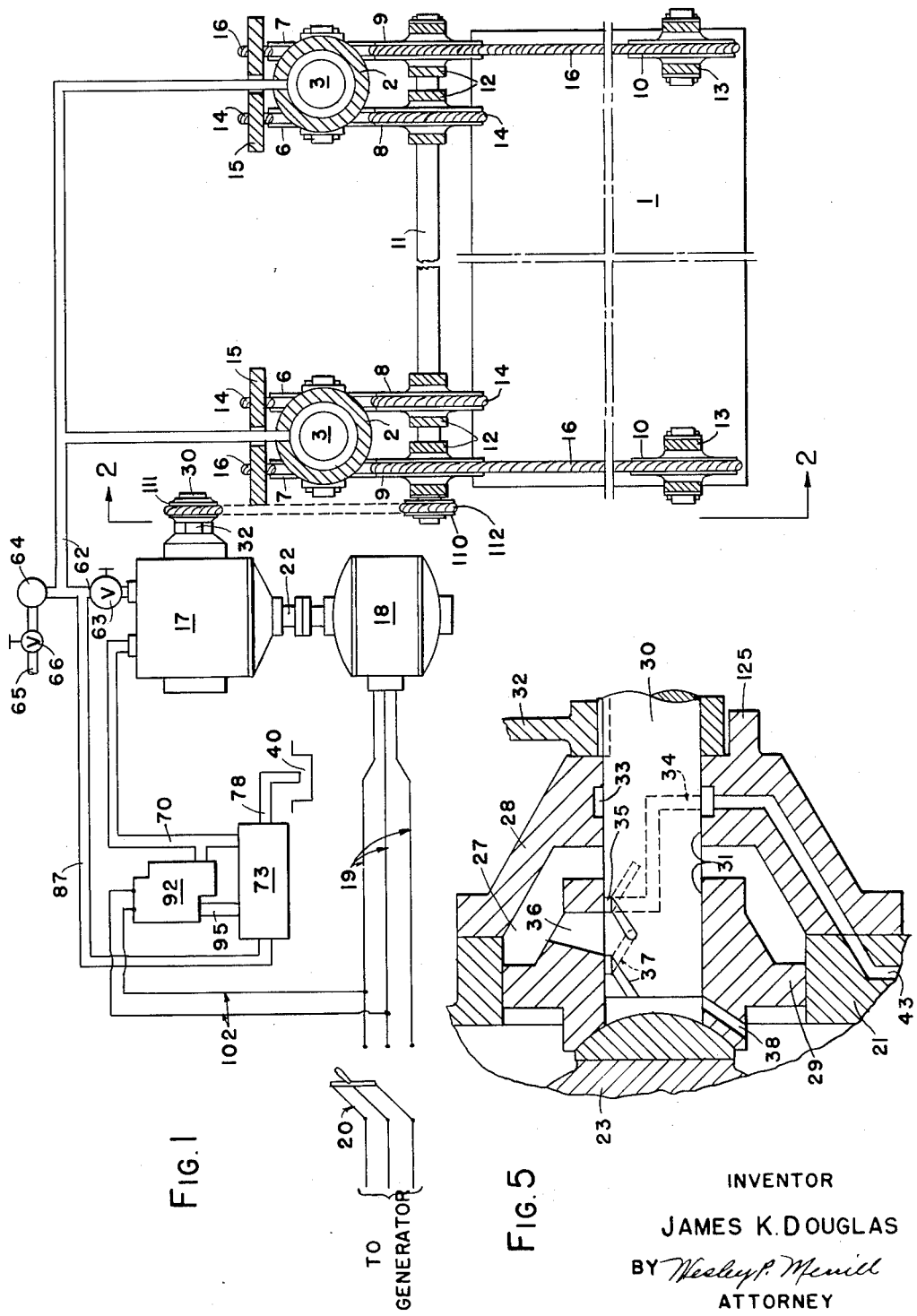
Fig. 1 is a circuit diagram showing a drive embodying the invention applied to a ship's elevator, the hydraulic motors of the drive being shown in section on the line 1—1 of Fig. 2.
Fig. 5 is a view illustrating the valve which controls the displacement of the pump, the view being similar to the right hand portion of the pump shown in Fig. 3 but drawn to a larger scale.

Each piston rod 4 has fixed to its lower end a block 5 which rotatably supports two wheels 6 and 7 on opposite sides thereof. As shown in Fig. 1, each wheel 6 is in radial alinement with a wheel 8 and each wheel 7 is in radial alinement with a wheel 9 and with a wheel 10. Both wheels 8 and both wheels 9 are fixed on a shaft 11 journaled in a plurality of bearings 12 which are fixed to deck A. Each wheel 10 is rotatably supported by a bracket 13 which is fixed to deck A.

Platform 1 is supported at its rear by two flexible connectors 14 each of which is attached at one end to platform 1 and extend upward and around one of the wheels 8, downward and around one of the wheels 6, then upward and has its other end attached to a bracket 15 which is fixed to deck A. Platform 1 is supported at it front by two flexible connectors 16 each of which is fixed at one end to platform 1 and extends upward and around one of the wheels 10, horizontally and around one of the wheels 9, downward and around one of the wheels 7, then upward and has its other end attached to one of the brackets 15.

It actual practice, connectors 14 and 16 are chains and wheels 6—10 are sprocket wheels or chain sheaves but, in order to simplify the drawing, connectors 14 and 16 have been shown as being cables and wheels 6—10 have been shown as being cable sheaves.

Liquid for energizing motors 2—4 is supplied by a reversible variable displacement pump 17 driven by an electric motor 18 which is connected by suitable conductors 19 and a switch 20 to a generator not shown. Pump 17 is a standard well known pump which is in extensive commercial use. It is deemed sufficient to state herein that pump 17 has its mechanism arranged within a casing 21 and driven from motor 18 by a shaft 22, that the pump includes a displacement varying member or slide block 23 which is shiftable in a horizontal plane transversely of shaft 22 but is restrained by casing 21 from movement in any other direction, that pump displacement is zero when slide block 23 is in its central or neutral position, and that pump 17 will discharge liquid in a direction and at a rate determined by the direction and distance slide block 23 is offset from its neutral position.

Slide block 23 is movable in one direction or the other by a hydraulic servo-motor comprising a cylinder 24 which is carried by casing 21 at one side thereof and is closed by a head 25, a piston 26 which is fitted in cylinder 24 and engages slide block 23, a cylinder 27 which is carried by casing 21 at the other side thereof and is closed by a head 28, and a piston 29 which is fitted in cylinder 27 and engages slide block 23. The pressure area of piston 29 is approximately twice that of piston 26 so that piston 29 can move slide block 23 toward the left when both of cylinders 24 and 27 are supplied with liquid at the same pressure.

Flow of liquid to and from cylinder 27 is under the control of a rotary valve 30 which, as best shown in Fig. 5, is rotatable in a bore 31 formed in cylinder head 28 and in piston 29. Valve 30 may be rotated in one direction or the other by a lever 32 fixed to its outer end.

End head 28 has formed therein around valve 30 an annular groove or port 33 to which liquid is continuously supplied as will presently be explained. Valve 30 has formed in the interior thereof a passage 34 which has one of its ends communicating with port 33 and its other end communicating with a groove 35 formed in the surface of valve 30 and extending diagonally downward toward the left on the near side thereof and downward toward the right on the far side thereof in respect to Fig. 5. The left hand edge of groove 35 normally is in alinement with the right hand edge of a port 36 which extends through the hub of piston 29 into communication with the interior of cylinder 27. The left hand edge of port 36 normally is in alinement with the right hand edge of a groove 37 which is formed in the surface of valve 30 and extends diagonally downward on the near side thereof to the inner end of valve 30. Groove 37 also has a diagonal portion which extends downward and toward the right on the far side of valve 30 as indicated in dotted lines.

The arrangement is such that, with cylinder 24 and port 33 continuously supplied with liquid at the same pressure which is always the case when pump 17 is operating as will presently be explained, rotating valve 30 in a clockwise direction in respect to Fig. 4 will move groove 35 into communication with port 36. Then liquid will flow from port 33 through passage 34, groove 35 and port 36 into cylinder 27 and move piston 29 and slide block 23 toward the left. Since port 36 is formed in piston 29, it will move out of communication with groove 35 when piston 29 and slide block 23 have been moved a linear distance exactly proportional to the angular distance through which valve 30 was rotated.

Conversely, rotation of valve 30 in a counterclockwise direction in respect to Fig. 4 will move groove 37 into communication with port 36 which will cause the pressure in cylinder 27 to drop. Then the liquid continuously supplied to cylinder 24 will move piston 26 and slide block 23 toward the right and cause piston 29 to eject liquid from cylinder 27 through port 36 and groove 37 into bore 31 from which it can escape to exhaust through a passage 38 formed in the inner end of piston 29. Port 36 will move with piston 29 and will move out of communication with groove 37 when piston 29 and slide block 23 have been moved a linear distance exactly proportional to the angular distance through which valve 30 was rotated.

Liquid for energizing the servo-motor is supplied by a gear pump 39 which actually is arranged within pump casing 21 and driven by shaft 22 as is customary but which has been shown separate therefrom in order to illustrate its function. Gear pump 39 draws liquid from the reservoir 40 and discharges it into a branched supply channel 41 one branch of which is connected to cylinder 24 and another branch of which is connected to port 33 as shown in Fig. 3.

A third branch of channel 41 is connected to the inlet of a relief valve 42 the outlet of which is connected to a channel 43 and to the inlet of a low pressure relief valve 44 which discharges into reservoir 40. Relief valve 42 is of a type which is not affected by the pressure at its outlet and it is adjusted to maintain in channel 41 a pressure, such as 150 p. s. i., which remains constant regardless of variations in the pressure at the outlet of valve 42. Whenever no other path is provided, any liquid discharged through valve 42 is exhausted into reservoir 40 through valve 44 which is adjusted to open at a lower pressure, such as 60 p. s. i.

When pump 17 is operating, it will discharge liquid through one and be supplied with liquid through the other of two ports 50 and 51 which are indicated by dotted lines in Fig. 3 because they are at the end of casing 21 opposite to that shown. Port 50 communicates with a channel 52 which is connected through a high pressure relief valve 53 and a check valve 54 to channel 43 and is connected through a check valve 55 to a channel 56 which extends into the supply of liquid contained in reservoir 40. Port 51 communicates with a channel 57 which is connected through a high pressure relief valve 58 and a check valve 59 to channel 43 and is connected through a check valve 60 to a channel 61 which extends into the supply of liquid in reservoir 40.

In order to indicate the functions of the several check and relief valves, they have been shown separate from pump casing 21 and reservoir 40 but in actual practice casing 21 is mounted directly upon reservoir 40 and the check and relief valves and the connecting channels are arranged within casing 21 and reservoir 40.

Pump 17 is a standard pump which as ordinarily employed discharges liquid into either side of a hydraulic circuit and has liquid returned to it from the other side of the circuit. When pump 17 is running, the liquid discharged by gear pump 39 into channel 43 flows therefrom through check valve 54 and channel 52 or through check valve 59 and channel 57 into whichever of ports 50 and 51 is the low pressure port. When pump 17 is discharging into one side of the circuit and the volume of liquid supplied from the other side of the circuit and by gear pump 39 is insufficient, it may draw liquid from reservoir 40 through channel 56, check valve 55 and channel 52 or through channel 61, check valve 60 and channel 57. If pump pressure should become excessive, pump 17 can discharge through high pressure relief valve 53 or 58, channel 43 and relief valve 44 into reservoir 40.

In the present instance however, pump 17 discharges liquid into the upper ends of hydraulic motors 2—4 to raise elevator platform 1 at a regulated rate and it pumps liquid out of the upper ends of motors 2—4 to permit platform 1 to descend by gravity at a regulated rate. As shown, port 50 is connected to the upper ends of cylinders 2 by a channel 62 having a shut-off valve 63 connected therein and an air drain valve 64 connected thereto at the highest point in the system. Air drain valve 64 discharges to atmosphere through a channel 65 having a shut-off valve 66 connected therein. Valves 63 and 66 are provided so that they may be closed and positively lock platform 1 in its upper position when pump 17 is idle. The lower ends of cylinders 2 are connected to exhaust as by means of a channel 67.

In order to control the amount of energy regenerated when the elevator descends, port 51 of pump 17 is connected by a channel 70 to an inlet port 71 formed in the casing 72 of a regeneration control valve 73. Casing 72 has a bore 74 and a counterbore 75 formed therein at the inner side of port 71 and an annular valve seat 76 formed therein at the outer side of port 71. Valve seat 76 extends around an outlet 77 which is connected to exhaust as by means of a channel 78 which connects it to reservoir 40.

Valve seat 76 normally is engaged by the end of a valve 79 which is fitted in bore 74 and formed integral with a piston 80 which is fitted in counterbore 75. Valve 79 has formed in its peripheral surface a groove 81 through which any pressure in port 71 can extend into counterbore 75 and urge valve 79 away from valve seat 76 by acting upon the lifting area 82 of piston 80 which is the annular area around valve 79.

The end of valve 79 normally is held in contact with seat 76 by a spring 83 arranged between a spring retainer 84, which engages piston 80, and a member 85 which forms a part of casing 72 and has a cylinder 86 arranged therein and connected to channel 62 by a channel 87. Cylinder 86 has fitted therein a plunger 88 which extends through the inner end of member 85 and is provided intermediate its ends with a collar 89 to engage the inner end of cylinder 86. Collar 89 is urged against the end of cylinder 86 by a spring 90 arranged between collar 89 and an annular shim 91 which is supported by the inner end of member 85. Shim 91 is provided in order that the resistance of spring 90 may be regulated by using a shim of a different thickness or by using a different number of shims.

Spring 83 may be a light spring having only sufficient strength to hold valve 79 to its seat when there is no pressure in port 71 but preferably it has a resistance equal to the force exerted upon lifting area 82 by a low pressure, such as 40 p. s. i., in order to maintain a low back pressure on pump 17 when the elevator is descending and to enable gear pump 39 to supercharge pump 17 when its displacement is zero and when it is discharging liquid through port 50 at a rate less than the gear pump discharge rate at which time the liquid discharged by gear pump 39 into channel 43 will flow therefrom through check valve 59 and passage 57 to port 51 and through channel 70, valve 73 and channel 78 to reservoir 40.

Spring 90 has a resistance equal to the force exerted by a given pressure, such as 350 p. s. i., upon plunger 88 which has a pressure area equal to the lifting area 82 on piston 81. When the pressure in cylinder 86 and in channels 87 and 62 exceeds that value, plunger 88 will engage spring retainer 84 and urge valve 79 toward its seat. Then the pressure required to keep valve 79 open must be increased by an amount equal to the difference between the pressure acting upon plunger 88 and the pressure required to compress spring 90.

In order to prevent the elevator from moving downward in case the electric power should fail, there is provided a magnetically operated safety pilot valve 92 having its mechanism arranged within a casing 93 containing a chamber 94 which is connected by a channel 95 to the interior of valve 73. Chamber 94 is also connected through a check valve 96 to channel 70 and through a check valve 97 to exhaust. Check valves 96 and 97 are both spring biased toward closed position and have the ends of the stems thereof arranged at opposite sides of a lever 98 which is arranged within chamber 94 and pivoted at one of its ends upon a pin 99 carried by casing 93. The other end of lever 98 is pivotally connected to the armature 100 of a solenoid 101 which is connected by conductors 102 to the conductors 19 through which electric motor 18 is energized.

The arrangement is such that, when the current to motor 18 is cut off, armature 100 will swing lever 98 downward which will permit check valve 97 to close and will open check valve 96 to permit any pressure in channel 70 to extend therefrom through check valve 96, chamber 94 and channel 95 into the interior of casing 73 where it will act upon the end of piston 80. Since the pressure area on the end of piston 80 is considerably greater than lifting area 82, valve 79 is positively held closed and no liquid can escape from the channel 70.

Figure 2:
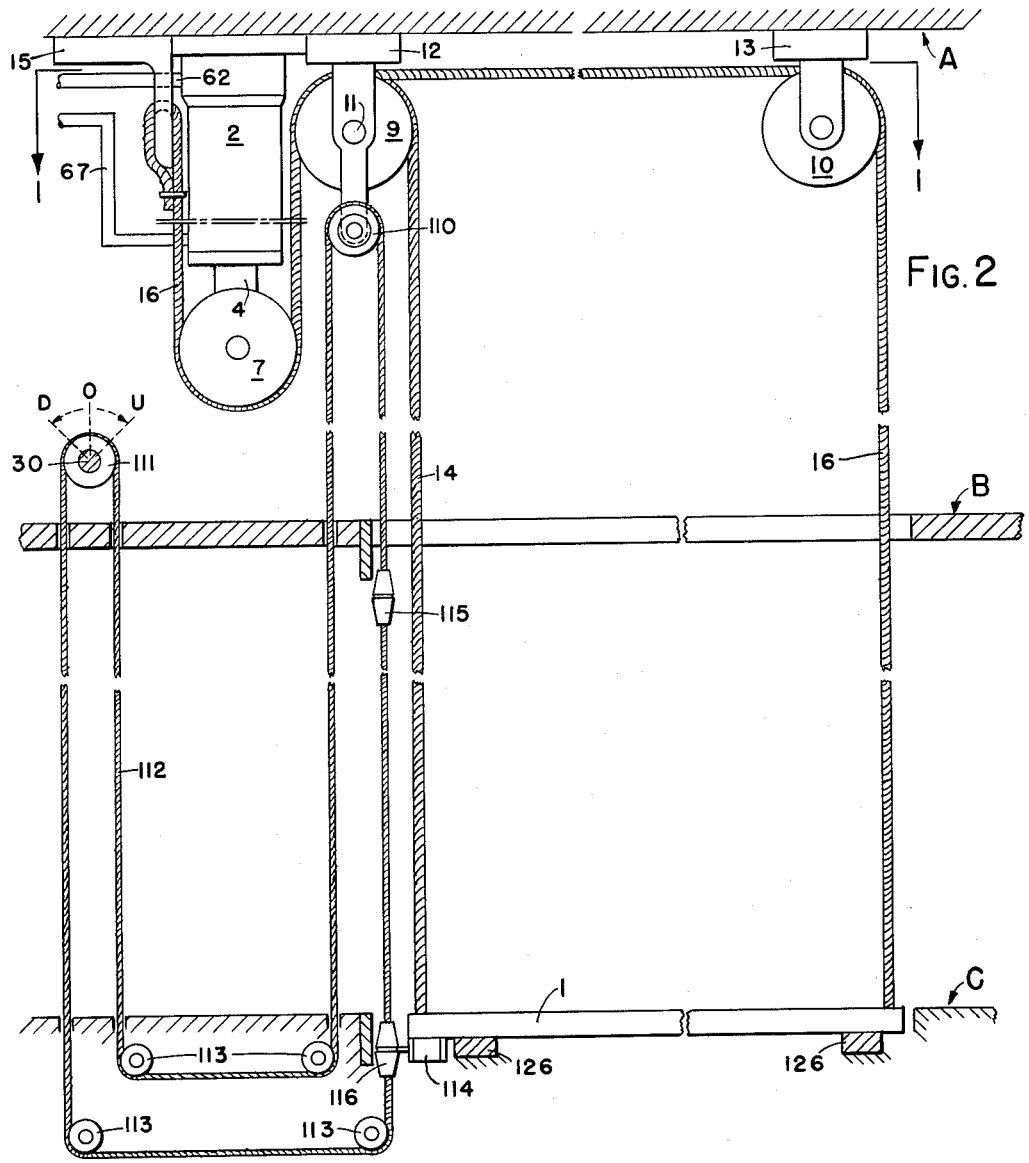
Fig. 2 is a diagram illustrating how the elevator is supported and a method of adjusting the pump, the view being taken on the line 2—2 of Fig. 1.

The control of pump 17 may be operated by any suitable mechanism. In practice, it is operated by a mechanism which includes a chain driven from shaft 11 and which is quite complicated. Therefore, the control has been represented by a simple device which includes a sheave 110 (Fig. 2) rotatably supported by one of the bearings 12, a sheave 111 fixed on the outer end of pump control valve 30, a cable 112 which has its ends joined together by a spring not shown and extends around sheaves 110 and 111 and under four deflector sheaves 113 arranged below deck C, and a detent 114 which is carried by platform 1 and adapted to engage first one and then the other of two stops 115 and 116 adjustably fixed upon cable 112 adjacent to decks B and C respectively.

Figure 6:
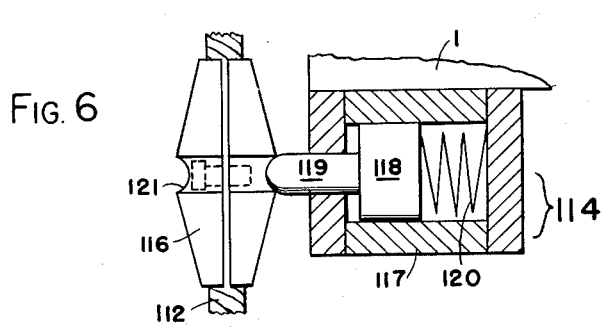
Fig. 6 is an enlarged view of the pump neutralizing mechanism shown in Fig. 2.

Detent 114 has been shown in Fig. 6 as including a casing 117 which is attached to platform 1, a piston 118 fitted in casing 117 and provided with a stem 119 which extends through the end wall of casing 117 and has its outer end rounded, and a spring 120 which is arranged in casing 117 and urges stem 119 outward.

Stop 116 has been shown in Fig. 6 as having an annular groove 121 formed therein at its center, as being gradually reduced in diameter toward its ends to provide sloping surfaces along which the rounded nose of stem 119 can ride, and as being split longitudinally into two parts which can be bolted together to clamp the stop in adjusted position on cable 112. Stop 115 is identical to stop 116. Stem 119 of detent 114 can ride along the sloping surface of a stop and compress spring 120 until it is snapped into groove 121 by spring 120. Then the stop will move with the detent and adjust the pump because only a very small force is required to rotate valve 30 but the operator can at any time easily disengage the stop from the detent by pulling upon cable 112.

Pulling on cable 112 causes it to rotate valve 30 but the angular distance through which valve 30 can be rotated is limited by a stop 125 which is carried by cylinder head 28 and is engaged by the hub of lever 32 when valve 30 has been rotated in either direction to a position in which it causes pump 17 to be adjusted to maximum displacement.

*Operation*

Assuming that the parts are in the positions shown, that platform 1 is resting upon supports 126 with its upper surface flush with the top of deck C, and that shut-off valves 63 and 66 are open, the drive will operate as follows:

Closing switch 20 will cause the electric motor 18 and solenoid 101 to be energized. Solenoid 101 will swing lever 98 upward to open check valve 97 and permit check valve 96 to close. Opening check valve 97 connects the interior of regeneration control valve 73 to exhaust and closing valve 96 prevents pressure from extending from channel 70 into the interior of valve 73.

Energizing motor 18 causes it to drive pumps 17 and 39. Pump 17 will not discharge any liquid because it is at or very nearly at zero stroke at this time. But pump 39 will discharge liquid through channel 41 and relief valve 42 into channel 43. The resistance of relief valve 42 will cause pressure to rise and extend through channel 41 to servo-motor cylinder 24 and port 33 so that liquid under pressure is available for operating the displacement varying mechanism of pump 17.

The liquid discharged into channel 43 will flow therefrom through check valve 59 and channels 57 and 70 to regeneration control valve 73 which will cause pressure to rise sufficiently to open it and then the liquid will flow therethrough and through channel 78 into reservoir 40. The pressure created in opening valve 73 extends through port 51 into one side of pump 17 and extends through check valve 54, channel 52 and port 50 into the other side of pump 17 and from port 50 through channels 62 and 87 into cylinders 2 and 86 so that a low pressure prevails in the entire system until pump 17 starts to discharge liquid.

Then pulling downward on the reach of cable 112 having stops 115 and 116 thereon will disengage stop 116 from detent 114 and will rotate pump control valve 30 in a direction to cause pump 17 to discharge liquid through port 50. The liquid discharged by pump 17 will flow through channel 62 to the upper ends of motors 2—4 which will move sheaves 6 and 7 downward and cause cables 14 and 16 to raise platform 1. As soon as pump 17 starts to discharge liquid at a rapid rate, gear pump 39 can not provide enough liquid to supply it. Therefore, pump 17 draws liquid from reservoir 40 through channel 61, check valve 60 and channel 57 into port 51.

As platform 1 approaches its upper position, detent 114 engages stop 115 and moves it upward, thereby rotating pump control valve 30 toward its neutral position which gradually reduces the displacement of pump 17 and decelerates platform 1. Stop 115 is fastened upon cable 112 in such a position that the displacement of pump 17 will be reduced to zero and further movement of platform 1 stopped when the upper surface of platform 1 is flush with the top of deck B.

To lower platform 1, the reach of cable 112 having stops 115 and 116 thereon is pulled upward to disengage stop 115 from detent 114 and to rotate valve 30 in a direction to cause pump 17 to pump liquid out of the upper ends of motors 2—4 and to discharge liquid through port 51. The liquid discharged through port 51 cannot flow through channel 57 into reservoir 40 due to check valve 60 and it must flow through channel 70 and regeneration control valve 73 which maintains a low pressure, such as 40 p. s. i., in port 51.

The weight of platform 1 at any load thereon causes pistons 3 to create pressure in cylinders 2 and to eject liquid therefrom through channel 62 into pump 17 and thereby cause it to function as a hydraulic motor and to drive electric motor 18 which will generate current and feed it back into the line. With the exception of a small amount of energy dissipated at valve 73 by forcing liquid therethrough at a low pressure such as 40 p. s. i., all of the energy in the liquid ejected from cylinders 2 is consumed driving pump 17 if the load on platform 1 is such that the pressure in cylinders 2 does not exceed a given value such as 350 p. s. i.

The pressure in cylinders 2 extends through channels 62 and 87 into cylinder 86 and acts upon plunger 88. If the load on platform 1 is such that the pressure in cylinders 2 exceeds a given value such as 350 p. s. i., the pressure will cause plunger 88 to compress spring 90 and urge valve 79 toward its seat with a force proportional to the difference between the given pressure and the pressure actually produced in cylinders 2, thereby increasing the amount of energy dissipated as heat at valve 73. Regeneration of electric current is thus prevented from exceeding a definite amount by valve 73.

When platform 1 approaches its lower limit, detent 114 will engage stop 116 and move it downward, thereby causing cable 112 to rotate pump control valve 30 toward its neutral position. Stop 116 may be so adjusted on cable 112 that the displacement of pump 17 will be reduced to exactly zero when platform 1 engages supports 126.

The motive liquid used in hydraulic drives is a mineral oil which becomes very thick and viscous when the drive stands idle for a considerable period of time in very cold weather. Pump 17 has been indicated as being of the type having its pistons and cylinders arranged radially in a cylinder barrel which rotates on a central valve shaft or pintle through which liquid flows to and from its cylinders. If the pump is started and adjusted to a substantial displacement when the oil is very cold and thick, localized heating of the pintle occurs with the result that the cylinder barrel is liable to and sometimes does sieze upon the pintle.

The drive disclosed herein is used on the elevators of ships which some times operate in extremely cold weather. In such a case, the pump is not adjusted to zero displacement in response to platform 1 engaging supports 126 but is adjusted to what is known as "slip stroke." That is, its displacement is reduced until it is pumping oil at a minute rate which is about equal to the slip or leakage in the pump at a low pressure.

Then the pump after being started is allowed to run at that small displacement for a short period of time, such as 5 minutes, before it is adjusted to effect upward movement of platform 1. During that period, gear pump 39 discharges oil through relief valve 42 and regeneration control valve 73 at which the energy in the oil is translated into heat which warms up the oil in the system. Gear pump 39 also supplies warmed oil through check valve 54, channel 52 and port 50 to pump 17 which transfers it to port 51, thereby warming up the pintle and the adjacent portions of the cylinder barrel so that the danger of seizure is avoided when pump 17 is adjusted to effect upward movement of platform 1.

If the power should fail, solenoid 101 would be deenergized and cause valve 97 to close and valve 96 to open and permit the pressure in channel 70 to extend through valve 96, chamber 94 and channel 95 to the interior of valve casing 72 and positively hold valve 79 closed regardless of how high the pressure in channel 70 should become because the end of piston 80 has an area about twice that of lifting area 82.

If the elevator should be descending and be driving the pump as explained above when the power failed, pump 17 would have to discharge through relief valve 58 which is adjusted to offer such a resistance to the flow of liquid therethrough that the elevator is quickly decelerated to zero speed without jerking. For example, valve 58 may be adjusted to open at 900 p. s. i.

If the elevator should be ascending when the power failed, it would tend to drive pump 17 backward which would cause pump 17 to tend to discharge liquid through port 51 but it cannot do so because valve 73 is positively held closed and the resistance of valve 58 is too great to permit it to be opened by a static load.

The hydraulic drive disclosed herein may be modified in various ways and adapted to other uses without departing from the scope of the invention which is hereby claimed as follows:

1. A hydraulic drive for moving in one direction a load which is urged in the opposite direction by an independent force, said drive comprising hydraulic motor means connected to said load, a valve casing having an inlet and an exhaust outlet, a resistance valve arranged in said casing and controlling communication between said inlet and said outlet, spring means urging said valve toward closed position to enable it to offer a low resistance to flow of liquid from said inlet to said outlet, a reversible pump having a high pressure port connected to said motor means and a low pressure port connected to said inlet, an electric motor connected to said pump to drive the same, a control carried by said pump and adjustable either to cause said pump to deliver liquid to said motor means and thereby enable it to move said load in said one direction or to cause said pump to discharge liquid through said resistance valve and permit said load to drive said motor means and cause it to deliver liquid to said high pressure port and thereby enable said pump to drive said electric motor and cause it to regenerate power, and means connected to said high pressure port and exerting upon said resistance valve an additional force to increase the resistance thereof in response to the pressure created by said motor means exceeding a predetermined value.

2. A hydraulic drive for moving in one direction a load which is urged in the opposite direction by an independent force, said drive comprising hydraulic motor means connected to said load, a valve casing having an inlet and an exhaust outlet, a resistance valve arranged in said casing and controlling communication between said inlet and said outlet, spring means urging said valve toward closed position to enable it to offer a low resistance to flow of liquid from said inlet to said outlet, a reversible pump having a high pressure port connected to said motor means and a low pressure port connected to said inlet, an electric motor connected to said pump to drive the same, a control carried by said pump and adjustable either to cause said pump to deliver liquid to said motor means and thereby enable it to move said load in said one direction or to cause said pump to discharge liquid through said resistance valve and permit said load to drive said motor means and cause it to deliver liquid to said high pressure port and thereby enable said pump to drive said electric motor and cause it to regenerate power, a cylinder arranged in said valve casing in alinement with said resistance valve, a plunger fitted in said cylinder, a spring urging said plunger away from said valve, and channel means connecting said cylinder to said high pressure port to enable the pressure therein to act upon said plunger and cause it to urge said valve toward closed position in response to the force exerted by said pressure upon said plunger exceeding the force exerted thereon by said spring.

3. A hydraulic drive for moving in one direction a load which is urged in the opposite direction by an independent force, said drive comprising hydraulic motor means connected to said load, a reversible pump having a high pressure port and a low pressure port, said pump including a displacement varying member normally occupying a neutral position in which pump displacement is zero and being shiftable to one side or the other of neutral to cause said pump to discharge liquid through one or the other of said ports, an electric motor connected to said pump to drive the same, a first channel connecting said high pressure port to said motor means, a reservoir containing a supply of liquid, a second channel connecting said low pressure port to said reservoir and having a check valve therein, a valve casing having an inlet and an exhaust outlet, a resistance valve arranged in said casing and controlling communication between said inlet and said outlet, spring means urging said valve toward closed position to enable it to offer a low resistance to flow of liquid from said inlet to said outlet, a third channel connecting said low pressure port to said inlet, a control carried by said pump for shifting said member, said control being adjustable to shift said member to one side of neutral and thereby cause said pump to deliver liquid to said motor means and enable it to move said load in said one direction or to shift said member to the other side of neutral and permit said load to drive said motor means and cause it to deliver liquid to said high pressure port and thereby enable said pump to drive said electric motor and cause it to regenerate power, and means connected to said high pressure port and exerting upon said resistance valve an additional force to increase the resistance thereof in response to the pressure created by said motor means exceeding a predetermined value.

4. A hydraulic drive for moving in one direction a load which is urged in the opposite direction by an independent force, said drive comprising hydraulic motor means connected to said load, a reversible pump having a high pressure port and a low pressure port, said pump including a displacement varying member normally occupying a neutral position in which pump displacement is zero and being shiftable to one side or the other of neutral to cause said pump to discharge liquid through one or the other of said ports, an electric motor connected to said pump to drive the same, a first channel connecting said high pressure port to said motor means, a reservoir containing a supply of liquid, a second channel connecting said low pressure port to said reservoir and having a check valve therein, a valve casing having an inlet and an exhaust outlet, a resistance valve arranged in said casing and controlling communication between said inlet and said outlet, spring means urging said valve toward closed position to enable it to offer a low resistance to flow of liquid from said inlet to said outlet, a third channel connecting said low pressure port to said inlet, a control carried by said pump for shifting said member, said control being adjustable to shift said member to one side of neutral and thereby cause said pump to deliver liquid to said motor means and enable it to move said load in said one direction or to shift said member to the other side of neutral and permit said load to drive said motor means and cause it to deliver liquid to said high pressure port and thereby enable said pump to drive said electric motor and cause it to regenerate power, a cylinder arranged in said valve casing in alinement with said resistance valve, a plunger fitted in said cylinder, a spring urging said plunger away from said valve, and channel means connecting said cylinder to said high pressure port to enable the pressure therein to act upon said plunger and cause it to urge said valve toward closed position in response to the force exerted by said pressure upon said plunger exceeding the force exerted thereon by said spring.

5. A hydraulic drive for moving in one direction a load which is urged in the opposite direction by an independent force, said drive comprising hydraulic motor means connected to said load, a valve casing having an inlet and an exhaust outlet and an enclosed spring chamber spaced from said inlet, a resistance valve controlling communication between said inlet and said outlet and having a lifting area exposed to the pressure in said inlet and a much larger pressure area exposed to any pressure in said chamber, spring means arranged in said chamber and urging said valve toward closed position to enable it to offer a low resistance to flow of liquid from said inlet to said outlet, a reversible pump having a high pressure port connected to said motor means and a low pressure port connected to said inlet, an electric motor connected to said pump to drive the same, a control carried by said pump and adjustable either to cause said pump to deliver liquid to said motor means and thereby enable it to move said load in said one direction or to cause said pump to discharge liquid through said resistance valve and permit said load to be moved in said opposite direction by said force, a pilot valve casing connected to said spring chamber and having a connection to exhaust and a connection to said inlet, and pilot valve means arranged in said pilot valve casing to control flow through said connections and having operating means including a solenoid electrically connected to said motor so that energizing said motor causes said solenoid to be energized and to adjust said valve means to connect said chamber to exhaust and power failure or deenergizing said motor causes said solenoid to be deenergized and to adjust said valve means to connect said chamber to said inlet and permit inlet pressure to extend into said chamber and positively hold said resistance valve closed.

6. A hydraulic drive for moving in one direction a load which is urged in the opposite direction by an independent force, said drive comprising hydraulic motor means connected to said load, a valve casing having an inlet and an exhaust outlet and an enclosed spring chamber spaced from said inlet, a resistance valve controlling communication between said inlet and said outlet and having a lifting area exposed to the pressure in said inlet and a much larger pressure area exposed to any pressure in said chamber, spring means arranged in said chamber and urging said valve toward closed position to enable it to offer a low resistance to flow of liquid from said inlet to said outlet, a reversible pump having a high pressure port connected to said motor means and a low pressure port connected to said inlet, an electric motor connected to said pump to drive the same, a control carried by said pump and adjustable either to cause said pump to deliver liquid to said motor means and thereby enable it to move said load in said one direction or to cause said pump to discharge liquid through said resistance valve and permit said load to drive said motor means and cause it to deliver liquid to said high pressure port and thereby enable said pump to drive said electric motor and cause it to regenerate power, means connected to said high pressure port and exerting upon said resistance valve an additional force to increase the resistance thereof in response to the pressure created by said motor means exceeding a predetermined value, a pilot valve casing connected to said spring chamber and having a connection to exhaust and a connection to said inlet, and pilot valve means arranged in said pilot valve casing to control flow through said connections and having operating means including a solenoid electrically connected to said motor so that energizing said motor causes said solenoid to be energized and to adjust said valve means to connect said chamber to exhaust and power failure or deenergizing said motor causes said solenoid to be deenergized and to adjust said valve means to connect said chamber to said inlet and permit inlet pressure to extend into said chamber and positively hold said resistance valve closed.

7. A hydraulic drive, for an elevator of the gravity return type having a carriage, comprising hydraulic motor means fixed to a stationary support, means connecting said motor means to said carriage, a valve casing having an inlet and an exhaust outlet, a resistance valve arranged in said casing and controlling communication between said inlet and said outlet, spring means urging said valve toward closed position to enable it to offer a low resistance to flow of liquid from said inlet to said outlet, a reversible pump having a high pressure port connected to said motor means and a low pressure port connected to said inlet, an electric motor connected to said pump to drive the same, a control carried by said pump and adjustable either to cause said pump to deliver liquid to said motor means and thereby enable it to raise said elevator or to cause said pump to discharge liquid through said resistance valve and permit said elevator to descend by gravity and cause said motor means to deliver liquid to said high pressure port and thereby enable said pump to drive said electric motor and cause it to regenerate power, and means connected to said high pressure port and exerting upon said resistance valve an additional force to increase the resistance thereof in response to the pressure created by said motor means exceeding a predetermined value.

8. A hydraulic drive, for an elevator of the gravity return type having a carriage, comprising hydraulic motor means fixed to a stationary support, means connecting said motor means to said carriage, a valve casing having an inlet and an exhaust outlet, a resistance valve arranged in said casing and controlling communication between said inlet and said outlet, spring means urging said valve toward closed position to enable it to offer a low resistance to flow of liquid from said inlet to said outlet, a reversible pump having a high pressure port connected to said motor means and a low pressure port connected to said inlet, an electric motor connected to said pump to drive the same, a control carried by said pump and adjustable either to cause said pump to deliver liquid to said motor means and thereby enable it to raise said elevator or to cause said pump to discharge liquid through said resistance valve and permit said elevator to descend by gravity and cause said motor means to deliver liquid to said high pressure port and thereby enable said pump to drive said electric motor and cause it to regenerate power, a cylinder arranged in said valve casing in alinement with said resistance valve, a plunger fitted in said cylinder, a spring urging said plunger away from said valve, and channel means connecting said cylinder to said high pressure port to enable the pressure therein to act upon said plunger and cause it to urge said valve toward closed position in response to the force exerted by said pressure upon said plunger exceeding the force exerted thereon by said spring.

9. A hydraulic drive, for an elevator of the gravity return type having a carriage, comprising hydraulic motor means fixed to a stationary support, means connecting said motor means to said carriage, a valve casing having an inlet and an exhaust outlet and an enclosed spring chamber spaced from said inlet, a resistance valve controlling communication between said inlet and said outlet and having a lifting area exposed to the pressure in said inlet and a much larger pressure area exposed to any pressure in said chamber, spring means arranged in said chamber and urging said valve toward closed position to enable it to offer a low resistance to flow of liquid from said inlet to said outlet, a reversible pump having a high pressure port connected to said motor means and a low pressure port connected to said inlet, an electric motor connected to said pump to drive the same, a control carried by said pump and adjustable either to cause said pump to deliver liquid to said motor means and thereby enable it to raise said elevator or to cause said pump to discharge liquid through said resistance valve and permit said elevator to descend, a pilot valve casing connected to said spring chamber and having a connection to exhaust and a connection to said inlet, and pilot valve means arranged in said pilot valve casing to control flow through said connections and having operating means including a solenoid electrically connected to said motor so that energizing said motor causes said solenoid to be energized and to adjust said valve means to connect said chamber to exhaust and power failure or deenergizing said motor causes said solenoid to be deenergized and to adjust said valve means to connect said chamber to said inlet and permit inlet pressure to extend into said chamber and positively hold said resistance valve closed.

10. A hydraulic drive, for an elevator of the gravity return type having a carriage, comprising hydraulic motor means fixed to a stationary support, means connecting said motor means to said carriage, a valve casing having an inlet and an exhaust outlet and an enclosed spring chamber spaced from said inlet, a resistance valve controlling communication between said inlet and said outlet and having a lifting area exposed to the pressure in said inlet and a much larger pressure area exposed to any pressure in said chamber, spring means arranged in said chamber and urging said valve toward closed position to enable it to offer a low resistance to flow of liquid from said inlet to said outlet, a reversible pump having a high pressure port connected to said motor means and a low pressure port connected to said inlet, an electric motor connected to said pump to drive the same, a control carried by said pump and adjustable either to cause said pump to deliver liquid to said motor means and thereby enable it to raise said elevator or to cause said pump to discharge liquid through said resistance valve and permit said elevator to descend by gravity and cause said motor means to deliver liquid to said high pressure port and thereby enable said pump to drive said electric motor and cause it to regenerate power, means connected to said high pressure port and exerting upon said resistance valve an additional force to increase the resistance thereof in response to the pressure created by said motor means exceeding a predetermined value, and a pilot valve casing connected to said spring chamber and having a connection to exhaust and a connection to said inlet, and pilot valve means arranged in said pilot valve casing to control flow through said connections and having operating means including a solenoid electrically connected to said motor so that energizing said motor causes said solenoid to be energized and to adjust said valve means to connect said chamber to exhaust and power failure or deenergizing said motor causes said solenoid to be deenergized and to adjust said valve means to connect said chamber to said inlet and permit inlet pressure to extend into said chamber and positively hold said resistance valve closed.

11. A hydraulic drive for an elevator of the gravity return type having a carriage movable to and from a lower position and a support upon which said carriage rests when in said lower position, said drive comprising hydraulic motor means fixed to a stationary support, means connecting said motor means to said carriage, a reversible pump having a high pressure port and a low pressure port, said pump including a displacement varying member normally occupying a neutral position in which pump displacement is zero and being shiftable to one side or the other of neutral to cause said pump to discharge liquid through one or the other of said ports, an electric motor connected to said pump to drive the same, a first channel connecting said high pressure port to said motor means, a reservoir containing a supply of liquid, a second channel connecting said low pressure port to said reservoir and having a check valve therein, a valve casing having an inlet and an exhaust outlet, a resistance valve arranged in said casing and controlling communication between said inlet and said outlet, spring means urging said valve toward closed position to enable it to offer a low resistance to flow of liquid from said inlet to said outlet, a control carried by said pump for shifting said member, said control being adjustable to shift said member to one side of neutral and thereby cause said pump to deliver liquid to said motor means and enable it to move said load in said one direction or to shift said member to the other side of neutral and permit said elevator to descend, a gear pump connected to said high and low pressure ports and driven in unison with said reversible pump to cause it to deliver liquid to either or both of said ports, means connected to said pump control for operating it, means movable in unison with said carriage and engaging said control operating means as said carriage approaches its lower position to cause said control to shift said displacement varying member toward neutral and stop it just short of neutral as said carriage engages said carriage support so that, when said electric motor is started after being stopped, said gear pump will discharge liquid at its full rate and said reversible pump will discharge liquid at a minute rate through said resistance valve and starting of said elevator may be delayed until some of the liquid and parts of the pump have been warmed up by the heat generated at said resistance valve.

<p align="center">No references cited.</p>